(12) United States Patent
Kim et al.

(10) Patent No.: US 12,320,961 B2
(45) Date of Patent: Jun. 3, 2025

(54) IMAGE CAPTURING LENS SYSTEM

(71) Applicant: Samsung Electro-Mechanics Co., Ltd., Suwon-si (KR)

(72) Inventors: Hag Chul Kim, Suwon-si (KR); Kyu Min Chae, Suwon-si (KR); Hyuk Joo Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/529,247

(22) Filed: Dec. 5, 2023

(65) Prior Publication Data

US 2024/0118521 A1 Apr. 11, 2024

Related U.S. Application Data

(63) Continuation of application No. 17/497,341, filed on Oct. 8, 2021, now Pat. No. 11,874,447, which is a
(Continued)

(30) Foreign Application Priority Data

May 9, 2018 (KR) ........................ 10-2018-0053223

(51) Int. Cl.
*G02B 13/00* (2006.01)
*B60R 11/00* (2006.01)
(Continued)

(52) U.S. Cl.
CPC .......... *G02B 13/0045* (2013.01); *G02B 9/64* (2013.01); *B60R 2011/004* (2013.01); *B60R 11/04* (2013.01)

(58) Field of Classification Search
CPC ..... B60R 11/04; B60R 2011/004; G02B 3/02; G02B 15/146; G02B 27/0025; G02B 9/62;
(Continued)

(56) References Cited

U.S. PATENT DOCUMENTS 4,468,100 A 8/1984 Itoh et al.
7,535,653 B2 5/2009 Sudoh
(Continued)

FOREIGN PATENT DOCUMENTS

CN 101042466 B 4/2010
CN 102914859 A 2/2013
(Continued)

OTHER PUBLICATIONS

Chinese Office Action dated Jan. 15, 2021, issued in counterpart Chinese Patent Application No. 201910199860.5 (6 pages in English, 7 pages in Chinese).
(Continued)

*Primary Examiner* — Travis S Fissel
(74) *Attorney, Agent, or Firm* — NSIP Law

(57) ABSTRACT

An image capturing lens system includes a first lens, a second lens, a third lens, a fourth lens, a fifth lens, a sixth lens, and a seventh lens sequentially arranged from an object side toward an image side. One or more of the lenses is an aspherical lens made of a glass material, and the sixth lens has positive refractive power.

12 Claims, 9 Drawing Sheets

Related U.S. Application Data continuation of application No. 16/193,086, filed on Nov. 16, 2018, now Pat. No. 11,169,361.

(51) Int. Cl.
  *B60R 11/04* (2006.01)
  *G02B 9/64* (2006.01)

(58) Field of Classification Search
  CPC ...... G02B 9/64; G02B 13/0045; G02B 13/18; G02B 13/0015; G02B 13/006; H04N 5/2254; H04N 5/222
  USPC ........ 359/656–658, 708, 713, 749, 755–762, 359/751, 682
  See application file for complete search history.

(56) References Cited

U.S. PATENT DOCUMENTS

| | | | |
|---|---|---|---|
| 10,295,790 | B2 | 5/2019 | Lai et al. |
| 2007/0247726 | A1 | 10/2007 | Sudoh |
| 2013/0033763 | A1 | 2/2013 | Sunaga et al. |
| 2014/0043694 | A1 | 2/2014 | Tsai et al. |
| 2014/0139931 | A1 | 5/2014 | Kubota |
| 2015/0192761 | A1 | 7/2015 | Tsai et al. |
| 2016/0054544 | A1 | 2/2016 | Ohashi et al. |
| 2016/0085054 | A1 | 3/2016 | Asami |
| 2016/0124191 | A1 | 5/2016 | Hashimoto |
| 2016/0223790 | A1 | 8/2016 | Liao et al. |
| 2016/0377839 | A1 | 12/2016 | Chen et al. |
| 2017/0011297 | A1 | 1/2017 | Li et al. |
| 2017/0059826 | A1 | 3/2017 | Tang et al. |
| 2017/0131520 | A1* | 5/2017 | Tang ................... G02B 7/04 |
| 2017/0248771 | A1 | 8/2017 | Tang et al. |
| 2017/0248772 | A1 | 8/2017 | Tang et al. |
| 2017/0248773 | A1 | 8/2017 | Tang et al. |
| 2017/0254982 | A1 | 9/2017 | Lai et al. |
| 2017/0254985 | A1 | 9/2017 | Lai et al. |
| 2017/0285299 | A1 | 10/2017 | Chen et al. |
| 2018/0011297 | A1 | 1/2018 | Lai et al. |
| 2018/0039049 | A1 | 2/2018 | Lee et al. |
| 2018/0196239 | A1 | 7/2018 | Chang et al. |

FOREIGN PATENT DOCUMENTS

| | | | |
|---|---|---|---|
| CN | 202886713 U | | 4/2013 |
| CN | 106291886 A | | 1/2017 |
| CN | 107065141 A | | 8/2017 |
| CN | 107132639 A | | 9/2017 |
| CN | 107132640 A | | 9/2017 |
| CN | 107132642 A | | 9/2017 |
| CN | 107153250 A | | 9/2017 |
| CN | 107153251 A | | 9/2017 |
| CN | 107589523 A | | 1/2018 |
| CN | 108227153 A | | 6/2018 |
| CN | 109975952 A | | 7/2019 |
| JP | 2010-85484 A | | 4/2010 |
| JP | 2010085484 A | * | 4/2010 |
| KR | 10-2018-0015485 A | | 2/2018 |
| TW | M542776 U | | 6/2017 |

OTHER PUBLICATIONS

Korean Office Action issued on Sep. 10, 2023, in counterpart Korean Patent Application No. 10-2018-0053223 (9 pages in English, 6 pages in Korean).

Korean Office Action issued on May 22, 2024, in counterpart Korean Patent Application No. 10-2018-0053223 (5 pages in English, 4 pages in Korean).

Chinese Office Action issued on Mar. 21, 2024, in counterpart Chinese Patent Application No. 202210321751.8 (5 pages in English, 11 pages in Chinese).

Korean Office Action Issued on Jan. 21, 2025, in Counterpart Korean Patent Application No. 10-2018-0053223 (3 Pages in English, 3 Pages in Korean).

Korean Office Action Issued on Jan. 21, 2025, in Counterpart Korean Patent Application No. 10-2018-0053223 (5 Pages in English, 3 Pages in Korean).

* cited by examiner

IMAGE CAPTURING LENS SYSTEM

CROSS-REFERENCE TO RELATED APPLICATION

This application is a continuation of U.S. patent application Ser. No. 17/497,341 filed on Oct. 8, 2021, which is a continuation of U.S. patent application No. 16/193,086 filed on Nov. 16, 2018, now U.S. Pat. No. 11,169,361 issued on Nov. 9, 2021, which claims the benefit under 35 USC 119(a) of Korean Patent Application No. 10-2018-0053223, filed on May 9, 2018, in the Korean Intellectual Property Office, the entire disclosures of which are incorporated herein by reference for all purposes.

BACKGROUND

The present disclosure relates to an image capturing lens system including one or more lenses formed of a glass material.

A small surveillance camera is configured to capture image information in a surveillance area. For example, such a small surveillance camera may be mounted on the front and rear bumpers of vehicles to provide captured images to a driver.

Since an initial small surveillance camera was configured to capture obstacles in a vicinity of a vehicle, the camera may not only have relatively low resolution but may also have a high variation in resolution in a temperature range of −40 to 80° C. However, as an autonomous navigation function of a vehicle is increasingly required, it has become necessary to develop a surveillance camera having a high resolution of 12 megapixels or more, which is reliable even in a high temperature change environment and an image capturing lens system suitable for such a surveillance camera.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image capturing lens system includes a first lens, a second lens, a third lens, a fourth lens, a fifth lens, a sixth lens, and a seventh lens sequentially arranged from an object side toward an image side. One or more of the lenses is an aspherical lens made of a glass material, and the sixth lens has positive refractive power.

The first lens may have negative refractive power.
The second lens may have negative refractive power.
The third lens may have positive refractive power.
The fourth lens may have positive refractive power.
The fifth lens may have negative refractive power.
The seventh lens may have positive refractive power.

The image capturing lens system may satisfy TTL/2Y<3.9, where TTL is a distance from an object side of the first lens to an imaging plane, and 2Y is a diagonal length of the imaging plane.

The image capturing lens system may satisfy 1.0<R2/f<1.5, where f is a total focal length of the image capturing lens system, and R2 is a radius of curvature of an image side of the first lens.

The image capturing lens system may satisfy 2.0<(R1+R2)/(R1−R2)<6.0, where R1 is a radius of curvature of an object side of the first lens, and R2 is a radius of curvature of an image side of the first lens.

The image capturing lens system may satisfy 0.2<f/f6<1.8, where f is a total focal length of the image capturing lens system, and f6 is a focal length of the sixth lens.

The image capturing lens system may satisfy 1.8<F No.<2.4, where F No. is an F No. of the image capturing lens system.

The image capturing lens system may satisfy 10<V6 −V7<30, where V6 is an Abbe number of the sixth lens, and V7 is an Abbe number of the seventh lens.

In another general aspect, an image capturing lens system includes a first lens, a second lens, a third lens, a fourth lens, a fifth lens, a sixth lens, and a seventh lens sequentially arranged from an object side toward an image side. The second lens, the sixth lens, and the seventh lens are aspherical lenses made of a glass material, and the second lens includes a convex object side surface.

The second lens may have a concave image side surface.
The sixth lens may have a convex object side surface.

In another general aspect, an image capturing lens system includes a first lens, a second lens, a third lens, a fourth lens, a fifth lens, a sixth lens, and a seventh lens sequentially arranged from an object side toward an image side. The second lens has a convex object side surface, and an image side surface of the fourth lens is bonded to an object side surface of the fifth lens.

The image capturing lens system may include a stop disposed between the third lens and the fourth lens.

A total refractive power of the first, second, and third lenses may be negative, and a total refractive power of the fourth, fifth, sixth, and seventh lenses may be positive.

The image capturing lens system may include a first filter and a second filter disposed between the seventh lens and an imaging plane.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
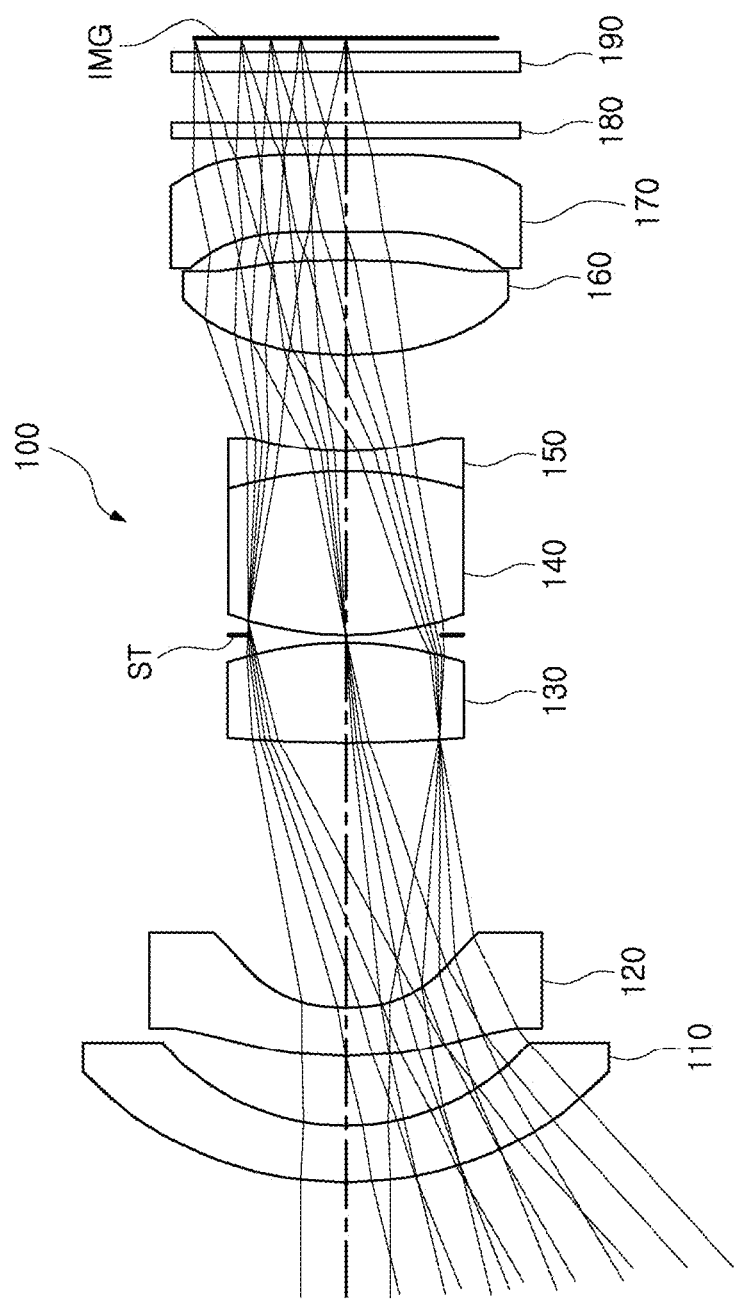
FIG. 1 is a configuration diagram of an image capturing lens system according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the present specification, a radius of curvature of a lens, a thickness of a lens, and a focal length of a lens are all indicated in millimeters (mm). In addition, the thickness of the lens and the gap between the lenses is measured based on an optical axis of the lens.

In the description of the shape of the lens, one surface of a lens being convex means that an optical axis portion of a corresponding surface is convex, while one surface of a lens being concave means that an optical axis portion of a corresponding surface is concave. Therefore, even when one surface of the lens is described as being convex, an edge portion of the lens may be concave. Likewise, even when one surface of the lens is described as the concave shape, an edge portion of the lens may be concave.

The image capturing lens system includes a plurality of lenses. For example, the image capturing lens system includes seven lenses. Configurations of respective lenses will be described below.

A first lens has refractive power. For example, the first lens may have negative refractive power.

The first lens has a convex shape on one surface. For example, the first lens may have a convex object side surface.

The first lens includes a spherical surface. For example, both surfaces of the first lens may be spherical. The first lens may be made of a material having a high light transmittance and excellent workability. For example, the first lens may be made of a glass material. However, the material of the first lens is not limited to glass. For example, the first lens may be made of a plastic material.

The first lens has a certain refractive index. For example, the refractive index of the first lens may be selected within a range of 1.5 to 1.7. The first lens may have an Abbe number lower than that of a second lens. For example, the Abbe number of the first lens may have a range of 50 to 65.

A second lens has refractive power. For example, the second lens may have negative refractive power.

The second lens has a convex shape on one surface. For example, the second lens may have a convex object side surface.

The second lens includes an aspherical surface. For example, both surfaces of the second lens may be aspherical. The second lens may be made of a material having a constant refractive index, even if temperature changes. For example, the second lens may be made of a glass material.

The second lens has a certain refractive index. For example, the refractive index of the second lens may be 1.60 or less. The second lens may have an Abbe number higher than that of the first lens. For example, the Abbe number of the second lens may be in a range of 60 to 90.

A third lens has refractive power. For example, the third lens may have positive refractive power.

The third lens has a convex shape on one surface. For example, the third lens may have a convex image side surface.

The third lens includes a spherical surface. For example, both surfaces of the third lens may be spherical. The third lens may be made of a material having high light transmittance and excellent workability. For example, the third lens may be made of a glass material. However, the material of the third lens is not limited to glass. For example, the third lens may be made of a plastic material.

The third lens has a certain refractive index. For example, the refractive index of the third lens may be 1.80 or more. The third lens may have an Abbe number lower than that of the second lens. For example, the Abbe number of the third lens may be 40 or less.

A fourth lens has refractive power. For example, the fourth lens may have positive refractive power.

The fourth lens has a convex shape on one surface. For example, the fourth lens has a convex object side surface.

The fourth lens includes a spherical surface. For example, both surfaces of the fourth lens may be spherical. The fourth lens may be made of a material having high light transmittance and excellent workability. For example, the fourth lens may be made of a glass material. However, the material of the fourth lens is not limited to glass. For example, the fourth lens may be made of a plastic material.

The fourth lens has a certain refractive index. For example, the refractive index of the fourth lens may be 1.70 or more. The fourth lens may have an Abbe number higher than that of the third lens. For example, the Abbe number of the fourth lens may be 40 or more.

A fifth lens has refractive power. For example, the fifth lens may have negative refractive power.

The fifth lens has a concave shape on one surface. For example, the fifth lens has a concave image side surface.

The fifth lens includes a spherical surface. For example, both surfaces of the fifth lens may be spherical. The fifth lens may be made of a material having high light transmittance and excellent workability. For example, the fifth lens may be made of a glass material. However, the material of the fifth lens is not limited to glass. For example, the fifth lens may be made of a plastic material.

The fifth lens is configured to be bonded to a neighboring lens. For example, the object side of the fifth lens may be bonded to the image side of the fourth lens.

The fifth lens has a certain refractive index. For example, the refractive index of the fifth lens may be 1.80 or more. The fifth lens may have an Abbe number lower than those of the neighboring lenses (in detail, the fourth lens and a sixth lens). For example, the Abbe number of the fifth lens may be 25 or less.

A sixth lens has refractive power. For example, the sixth lens may have positive refractive power.

The sixth lens has a convex shape on one surface. For example, the sixth lens may have a convex object side surface.

The sixth lens includes an aspherical surface. For example, both surfaces of the sixth lens may be aspherical. The sixth lens may be made of a material having a constant refractive index, even if temperature changes. For example, the sixth lens may be made of a glass material.

The sixth lens has a certain refractive index. For example, the refractive index of the sixth lens may be 1.60 or less. The sixth lens may have an Abbe number higher than those of the neighboring lenses (in detail, the fifth lens and a seventh lens). For example, the Abbe number of the sixth lens may be 55 or more.

A seventh lens has refractive power. For example, the seventh lens may have positive refractive power.

The seventh lens has a convex shape on one surface. For example, the seventh lens has a convex image side surface.

The seventh lens includes an aspherical surface. For example, both surfaces of the seventh lens may be aspherical. The seventh lens may be made of a material having a constant refractive index, even if temperature changes. For example, the seventh lens may be made of a glass material.

The seventh lens has a certain refractive index. For example, the refractive index of the seventh lens may be 1.80 or more. The seventh lens may have an Abbe number lower than that of the sixth lens. For example, the Abbe number of the seventh lens may be 45 or less.

The image capturing lens system includes one or more aspherical lenses. For example, one or more of the first lens to the seventh lens include an aspherical surface. The image capturing lens system including one or more aspherical lenses may be advantageous for realizing a high resolution. For reference, an aspherical surface may be expressed by Equation 1.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18}$$

Equation 1

In Equation 1, c is a reciprocal of a radius of curvature of the lens, k is a conic constant, r is a distance from an arbitrary point on the aspherical surface to the optical axis, A to H are aspheric constants, and Z (or SAG) is a height in the optical axis direction from an arbitrary point on the aspheric surface to the apex of the aspheric surface.

The image capturing lens system includes an image sensor. The image sensor may be configured to realize a high resolution. The surface of the image sensor may form an imaging plane forming the image.

The image capturing lens system includes a stop. The stop may be disposed between two lenses of the image capturing lens system. For example, the stop may be disposed between the third lens and the fourth lens. The stop disposed in this way may adjust an amount of light incident on the image sensor.

The stop is configured to bisect the refractive power of the image capturing lens system. For example, the total refractive power of the lenses located on a front side (object side) of the stop may be negative, and the total refractive power of the lenses located on a rear side (imaging plane side) of the stop may be positive. Such a dispositional structure may be advantageous in reducing an overall length of the optical system, while widening the angle of view of the image capturing lens system.

The image capturing lens system includes a plurality of filters. A filter is disposed between the seventh lens and the image sensor to remove components that hinder resolution. For example, the filter may block infrared light wavelengths. The filter has a certain refractive index. For example, the refractive index of the filter may be 1.50 or more. The filter may have an Abbe number which is generally similar to that of the seventh lens. For example, the Abbe number of the filter may be 60 or more.

The image capturing lens system is configured to substantially reduce a change in focal length depending on the temperature. For example, three or more lenses in the image capturing lens system may be configured to be made of a glass material.

The image capturing lens system may have a constant resolution even at a high temperature and a low temperature. The image capturing lens system may provide a dear image to a user even when the image capturing lens system is installed in a place such as a front and rear bumper of the vehicle, which is likely to be exposed to the external environment.

The image capturing lens system may have a wide angle of view. Therefore, the image capturing lens system may be employed not only in a surveillance camera of a vehicle, but also in a camera requiring a wide angle of view such as a surveillance camera for a drone.

The image capturing lens system is configured to satisfy one or more of the following conditional expressions.

[Conditional Expression 1] TTL/2Y<3.9
[Conditional Expression 2] 1.0<R2/f<1.5
[Conditional Expression 3] 2.0<(R1+R2)/(R1-R2)<6.0
[Conditional Expression 4] −1.5<f/f1<−0.05
[Conditional Expression 5] 0.1<f/f3<2.0
[Conditional Expression 6] 0.2<f/f6<1.8
[Conditional Expression 7] 0<f/f7<1.0
[Conditional Expression 8] 1.8<F No.<2.4
[Conditional Expression 9] 10<V6 −V7 <30
[Conditional Expression 10] −0.8<SAGL7R1

In the above conditional expressions, TTL is a distance from an object side of the first lens to an imaging plane, 2Y is a diagonal length of an imaging plane (Y is 1/2 of 2Y), R1 is a radius of curvature of the object side of the first lens, R2 is a radius of curvature of an image side of the first lens, f is a total focal length of the image capturing lens system, f1 is a focal length of the first lens, f3 is a focal length of the third lens, f6 is a focal length of the sixth lens, f7 is a focal length of the seventh lens, V6 is an Abbe number of the sixth lens, V7 is an Abbe number of the seventh lens, and SAGL7R1 is a seg of the object side of the seventh lens.

An image capturing lens system according to various examples will be described below.

An image capturing lens system according to an example will be described with reference to FIG. 1.

An image capturing lens system 100 is comprised of a plurality of lenses having refractive power. For example, the image capturing lens system 100 includes a first lens 110, a second lens 120, a third lens 130, a fourth lens 140, a fifth lens 150, a sixth lens 160, and a seventh lens 170.

The first lens 110 has negative refractive power, an object side is convex and an image side is concave. The second lens 120 has negative refractive power, an object side is convex and an image side is concave. The third lens 130 has positive refractive power, an object side is convex and an image side is convex. The fourth lens 140 has positive refractive power, an object side is convex and an image side is convex. The fifth lens 150 has negative refractive power, an object side is concave and an image side is concave. The sixth lens 160 has positive refractive power, an object side is convex and an image side is convex. The seventh lens 170 has positive refractive power, an object side is concave and an image side is convex.

The image capturing lens system 100 includes a plurality of aspherical lenses. The second lens 120, the sixth lens 160, and the seventh lens 170 are formed as aspheric surfaces on both surfaces. The image capturing lens system 100 includes a lens made of a glass material to exhibit a certain degree of optical performance even when temperature changes according to the external environment. The second lens 120, the sixth lens 160, and the seventh lens 170 are made of a glass material.

The image capturing lens system 100 includes a stop ST. The stop ST is disposed between the third lens 130 and the fourth lens 140.

The image capturing lens system 100 includes a plurality of filters 180 and 190. The filters 180 and 190 are disposed between the seventh lens 170 and an imaging plane IMG. At least one of the filters 180 and 190 may block infrared rays and another may block contamination of the imaging plane due to foreign substances.

The image capturing lens system 100 includes one or more cemented lenses. An image side of the fourth lens 140 and an object side of the fifth lens 150 are bonded.

The image capturing lens system 100 may have a wide angle of view. For example, the image capturing lens system may have an angle of view of 84.34 degrees. The image capturing lens system 100 may have a low F No. For example, the F No. of the image capturing lens system 100 is 2.06. The total focal length of the image capturing lens system 100 is 4.8 mm.

Table 1 illustrates the lens characteristics of the image capturing lens system 100, and Table 2 illustrates the aspherical surface coefficients of the lenses.

TABLE 1

| Surface No. | Remark | Radius of Curvature | Thickness/distance | Focal length | Index | Abbe No. |
|---|---|---|---|---|---|---|
| obj | Object | infinity | infinity | | | |
| 1 | 1$^{st}$ lens | 9.5 | 1.5 | −34.605 | 1.6968 | 55.4 |
| 2 | | 6.3782145 | 1.819749 | | | |
| 3* | 2$^{nd}$ lens | 13.5 | 1.2395621 | −8.713 | 1.5891 | 61.1 |
| 4* | | 3.6 | 7 | | | |
| 5 | 3$^{rd}$ lens | 37.694452 | 2.5883798 | 9.719 | 1.806 | 33.2 |
| 6 | | −9.652257 | 0.2 | | | |
| 7 | Stop | infinity | 0 | | | |
| 8 | 4$^{th}$ lens | 9.8078668 | 4.3071075 | 6.846 | 1.8042 | 46.5 |
| 9 | 5$^{th}$ lens | −10.18245 | 0.55 | −8.986 | 1.9459 | 17.9 |
| 10 | | 9.9143945 | 2.4829172 | | | |
| 11* | 6$^{th}$ lens | 8.0538072 | 2.5 | 10.084 | 1.5831 | 59.3 |

TABLE 1-continued

| Surface No. | Remark | Radius of Curvature | Thickness/ distance | Focal length | Index | Abbe No. |
|---|---|---|---|---|---|---|
| 12* | | −19.5195 | 0.7322844 | | | |
| 13* | 7$^{th}$ lens | −800 | 2 | 1476.032 | 1.8059 | 40.9 |
| 14* | | −479.4158 | 0.5 | | | |
| 15 | 1$^{st}$ filter | infinity | 0.4 | | 1.5167 | 64.1 |
| 16 | | infinity | 1.3 | | | |
| 17 | 2$^{nd}$ filter | infinity | 0.5 | | 1.5167 | 64.1 |
| 18 | | infinity | 0.4 | | | |
| IMG | Imaging plane | infinity | −0.02 | | | |

TABLE 2

| Surface No. | K | A | B | C | D |
|---|---|---|---|---|---|
| 3 | 5.227096442 | 0.001636817 | −0.00019292 | 5.89198E−06 | −8.4325E−08 |
| 4 | −3.6261014 | 0.011367618 | −0.00069927 | 2.24111E−05 | −1.3434E−07 |
| 11 | −8.22855458 | 0.001783754 | −2.1618E−05 | 1.24698E−06 | 3.11361E−08 |
| 12 | 0 | −0.00129681 | 0.000114489 | | |
| 13 | 0 | −0.00319678 | −0.00013575 | 8.26954E−06 | −7.1832E−08 |
| 14 | 99 | −0.00018985 | −0.00023697 | 1.07742E−05 | −1.5117E−07 |

Figure 2:
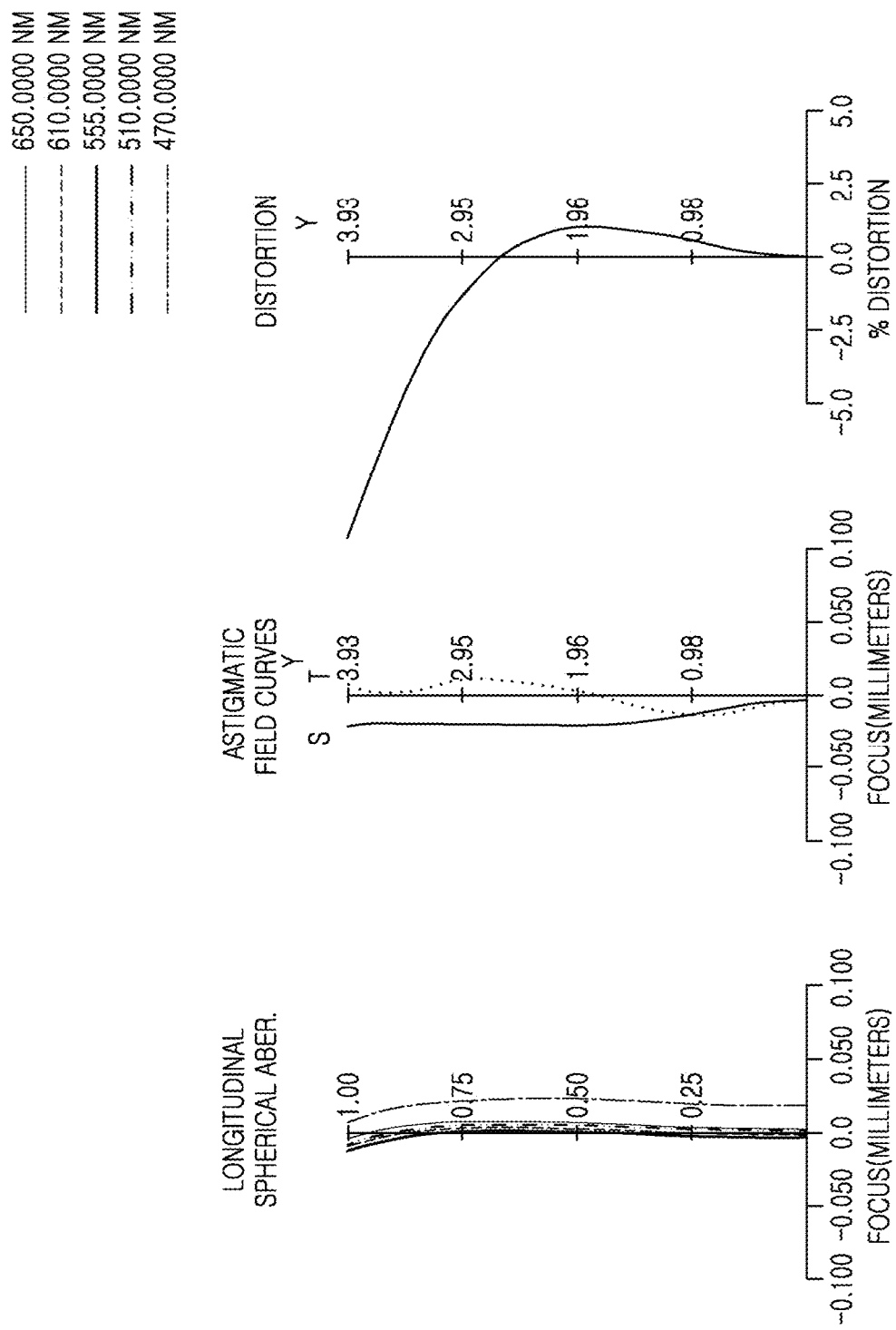
FIG. 2 is a diagram illustrating aberration curves of the image capturing lens system illustrated in FIG. 1.
Figure 3:
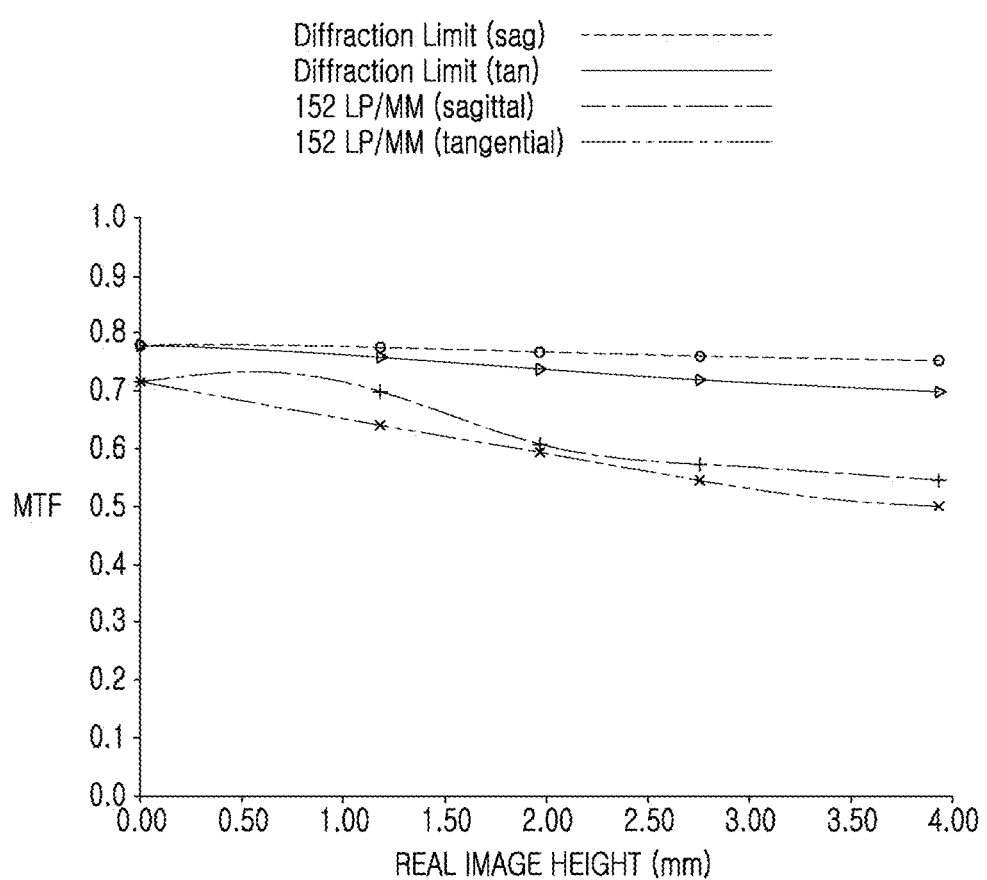
FIG. 3 is a diagram illustrating modulation transfer function (MTF) curves according to a temperature change of the image capturing lens system illustrated in FIG. 1.

FIG. 2 illustrates aberration curves of the image capturing lens system 100, and FIG. 3 is a graph illustrating MTF characteristics of the image capturing lens system 100.

Figure 4:
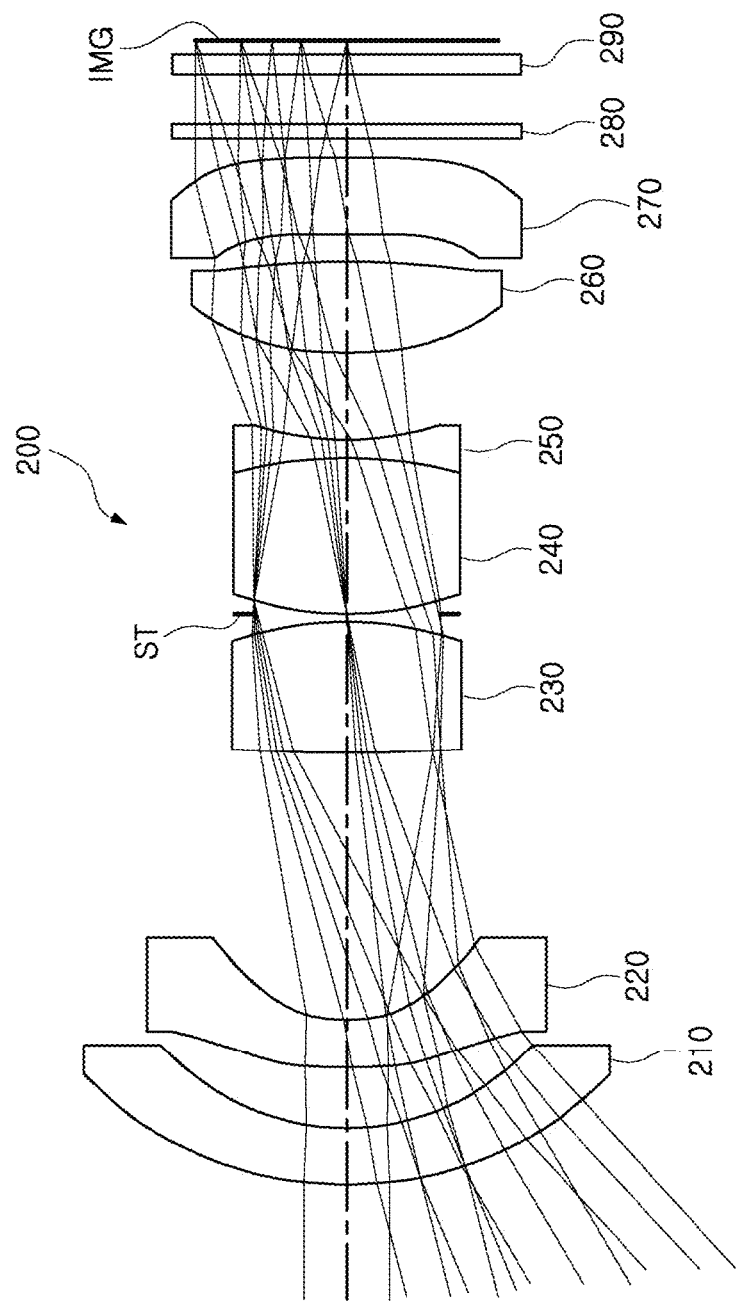
FIG. 4 is a configuration diagram of the image capturing lens system according to an example.

Next, an image capturing lens system according to another example will be described with reference to FIG. 4.

An image capturing lens system 200 includes a plurality of lenses having refractive power. For example, the image capturing lens system 200 includes a first lens 210, a second lens 220, a third lens 230, a fourth lens 240, a fifth lens 250, a sixth lens 260, and a seventh lens 270.

The first lens 210 has negative refractive power, an object side is convex and an image side is concave. The second lens 220 has negative refractive power, an object side is convex and an image side is concave. The third lens 230 has positive refractive power, an object side is convex and an image side is convex. The fourth lens 240 has positive refractive power, an object side is convex and an image side is convex. The fifth lens 250 has negative refractive power, an object side is concave and an image side is concave. The sixth lens 260 has positive refractive power, an object side is convex and an image side is convex. The seventh lens 270 has positive refractive power, an object side is concave and an image side is convex.

The image capturing lens system 200 includes a plurality of aspherical lenses. The second lens 220, the sixth lens 260, and the seventh lens 270 are formed as aspheric surfaces on both surfaces, The image capturing lens system 200 includes a lens made of a glass material to exhibit a certain degree of optical performance even when temperature changes according to the external environment. The second lens 220, the sixth lens 260, and the seventh lens 270 are made of a glass material.

The image capturing lens system 200 includes a stop ST. The stop ST is disposed between the third lens 230 and the fourth lens 240.

The image capturing lens system 200 includes a plurality of filters 280 and 290, The filters 280 and 290 are disposed between the seventh lens 270 and an imaging plane IMG. At least one of the filters 280 and 290 may block infrared rays and another may block contamination of the imaging plane by foreign substances.

The image capturing lens system 200 includes one or more cemented lenses. The image side of the fourth lens 240 and the object side of the fifth lens 250 are bonded.

The image capturing lens system 200 may have a wide angle of view. For example, the image capturing lens system may have an angle of view of 84.33 degrees. The image capturing lens system 200 may have a low F No. For example, the F No. of the image capturing lens system 200 is 2.06. The total focal length of the image capturing lens system 200 is 4.56 mm.

Table 3 illustrates the lens characteristics of the image capturing lens system 200, and Table 4 illustrates aspherical surface coefficients of the lenses.

TABLE 3

| Surface No. | Remark | Radius of Curvature | Thickness/ distance | Focal length | Index | Abbe No. |
|---|---|---|---|---|---|---|
| obj | Object | infinity | infinity | | | |
| 1 | 1$^{st}$ lens | 9.5 | 1.5 | −37.764 | 1.6968 | 55.4 |
| 2 | | 6.5322742 | 1.5772349 | | | |
| 3* | 2$^{nd}$ lens | 13.5 | 1.2395621 | −8.713 | 1.5891 | 61.1 |
| 4* | | 3.6 | 7 | | | |
| 5 | 3$^{rd}$ lens | infinity | 3.4351014 | 10.068 | 1.806 | 33.2 |
| 6 | | −9.394899 | 0.2 | | | |
| 7 | Stop | infinity | 0 | | | |
| 8 | 4$^{th}$ lens | 8.76 | 4.0703688 | 6.759 | 1.8042 | 46.5 |

TABLE 3-continued

| Surface No. | Remark | Radius of Curvature | Thickness/ distance | Focal length | Index | Abbe No. |
|---|---|---|---|---|---|---|
| 9 | 5th lens | −11.46071 | 0.55 | −8.171 | 1.9459 | 17.9 |
| 10 | | 8.7588363 | 2.2336307 | | | |
| 11* | 6th lens | 8.1664054 | 2.4047671 | 11.349 | 1.5831 | 59.3 |
| 12* | | −31.62934 | 0.709335 | | | |
| 13* | 7th lens | −800 | 2 | 35.124 | 1.8059 | 40.9 |
| 14* | | −27.44777 | 0.5 | | | |
| 15 | 1st filter | infinity | 0.4 | | 1.5167 | 64.1 |
| 16 | | infinity | 1.3 | | | |
| 17 | 2nd filter | infinity | 0.5 | | 1.5167 | 64.1 |
| 18 | | infinity | 0.4 | | | |
| IMG | Imaging plane | infinity | −0.02 | | | |

TABLE 4

| Surface No. | K | A | B | C | D |
|---|---|---|---|---|---|
| 3 | 5.03918955 | 0.003256351 | −0.00027864 | 7.81055E−06 | −9.7093E−08 |
| 4 | −4.33721229 | 0.015070621 | −0.00093181 | 2.36552E−05 | 1.19187E−07 |
| 11 | −14.246571 | 0.002591668 | −0.00010615 | 7.37895E−06 | −1.3781E−07 |
| 12 | 0 | −0.00316442 | 0.000214073 | | |
| 13 | 0 | −0.00373411 | −0.00023593 | 1.65474E−05 | −2.0031E−07 |
| 14 | 21.96015619 | 0.001558305 | −0.00041635 | 1.88591E−05 | −2.8579E−07 |

Figure 5:
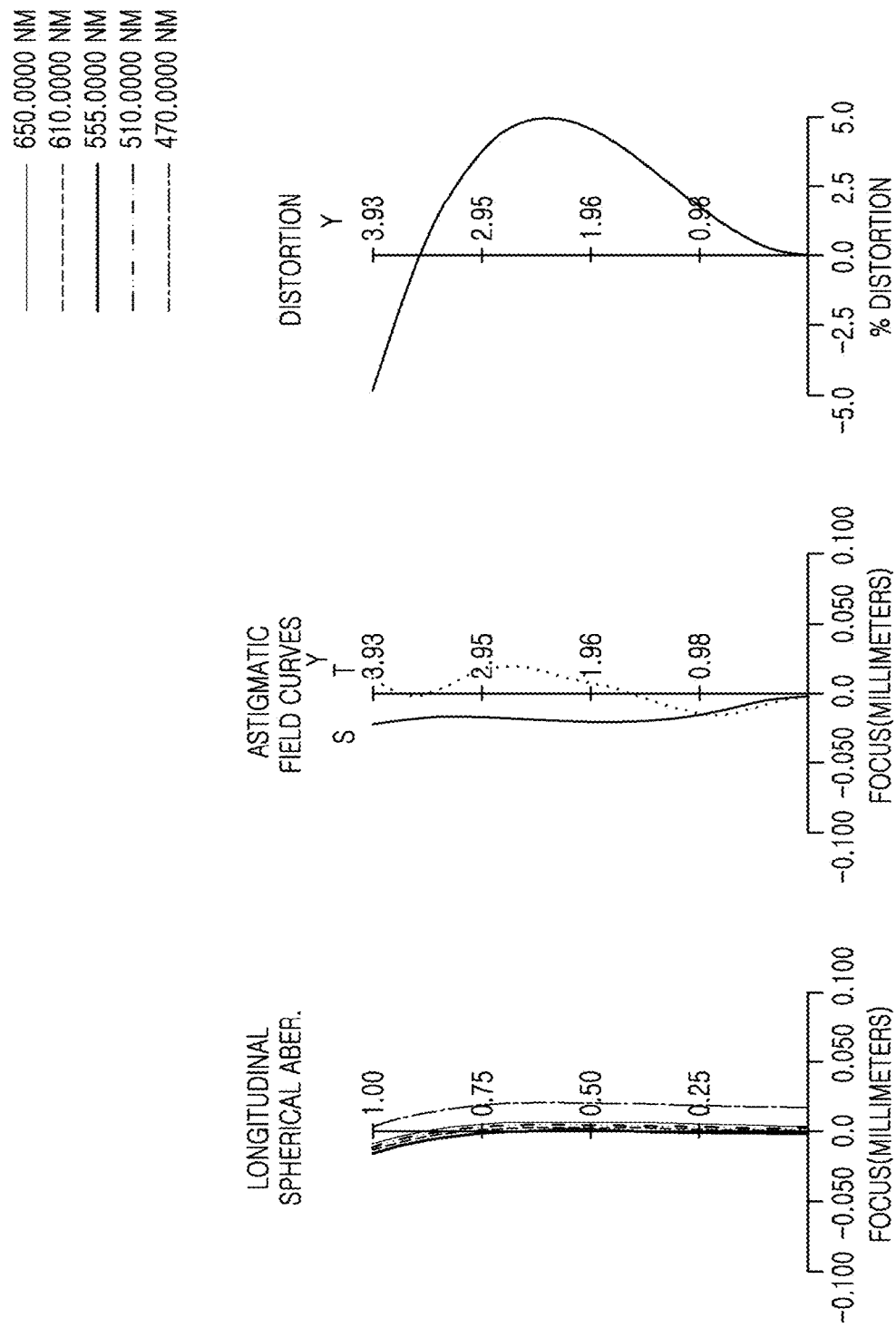
FIG. 5 is a diagram illustrating aberration curves of the image capturing lens system illustrated in FIG. 4.
Figure 6:
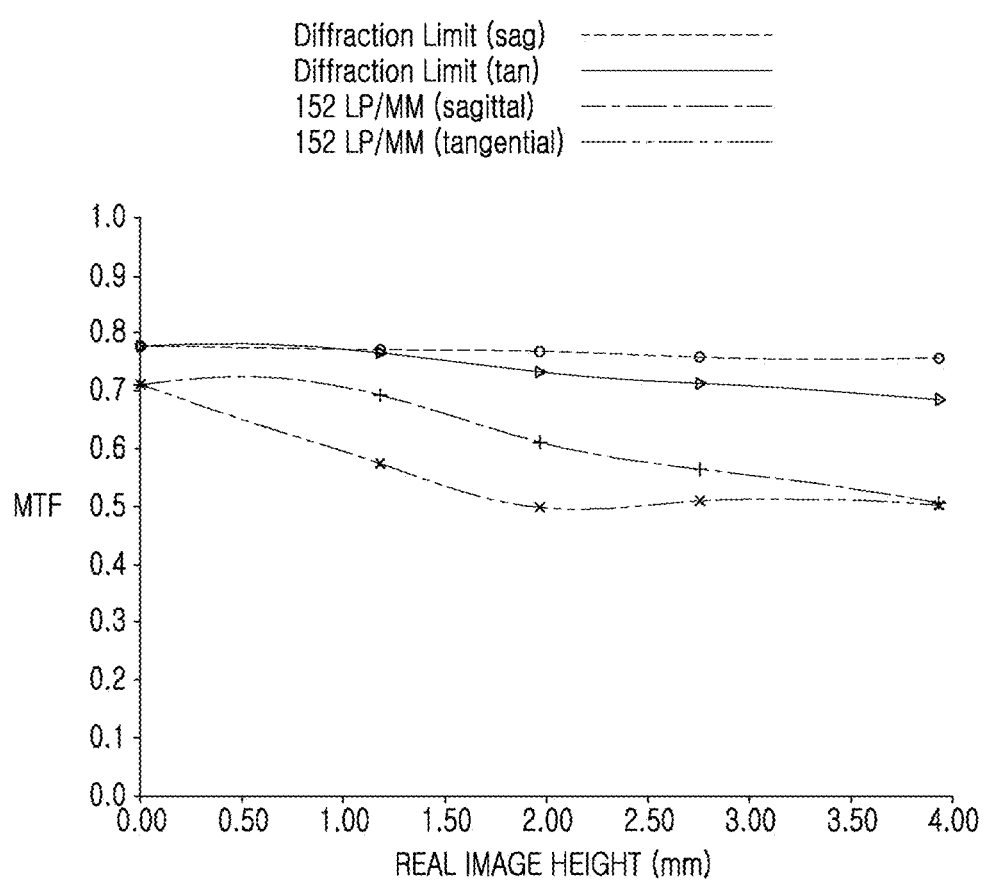
FIG. 6 is a diagram illustrating MTF curves according to a temperature change of the image capturing lens system illustrated in FIG. 4.

FIG. 5 illustrates aberration curves of the image capturing lens system 200, and FIG. 6 is a graph illustrating MTF characteristics of the image capturing lens system 200.

Figure 7:
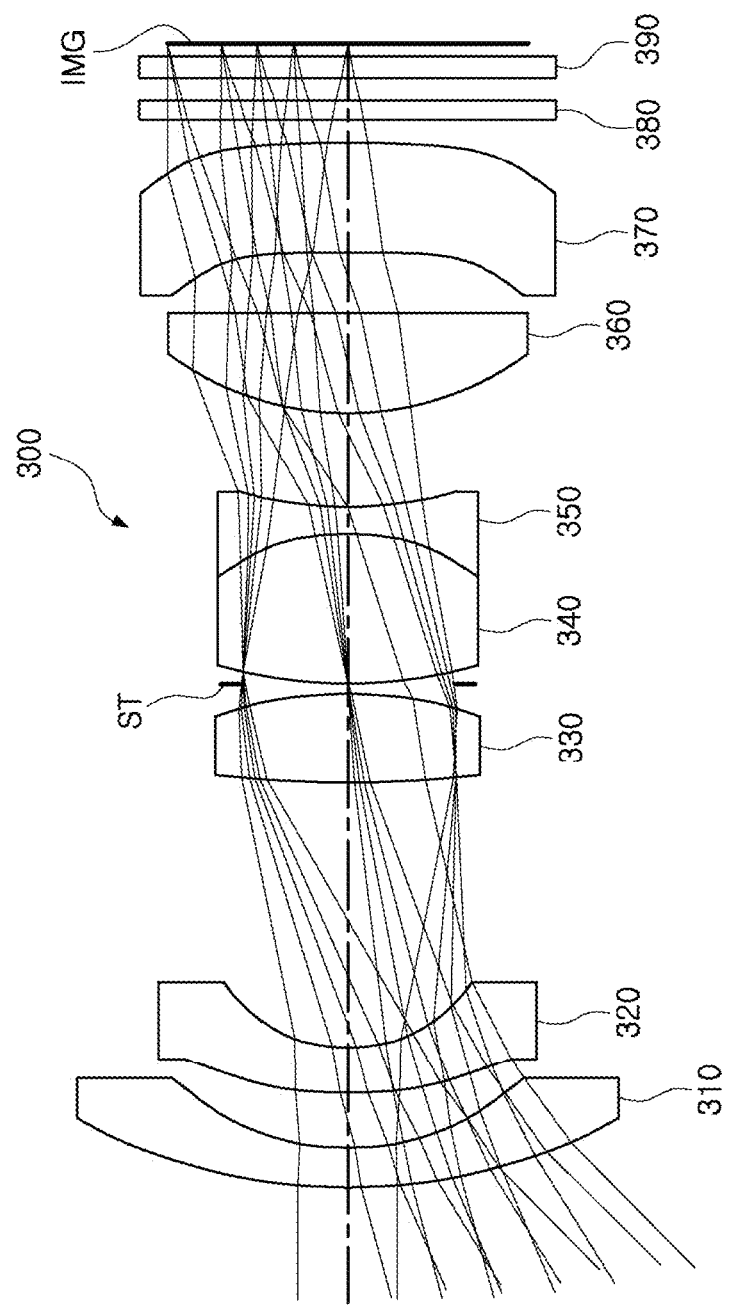
FIG. 7 is a configuration diagram of an image capturing lens system according to an example.

Next, an image capturing lens system according to another example will be described with reference to FIG. 7.

An imacie capturing lens system 300 includes a plurality of lenses having refractive powers. For example, the image capturing lens system 300 includes a first lens 310, a second lens 320, a third lens 330, a fourth lens 340, a fifth lens 350, a sixth lens 360, and a seventh lens 370.

The first lens 310 has negative refractive power, an object side is convex and an image side is concave. The second lens 320 has negative refractive power, an object side is convex and an image side is concave. The third lens 330 has positive refractive power, an object side is convex and an image side is convex. The fourth lens 340 has positive refractive power, an object side is convex and an image side is convex. The fifth lens 350 has negative refractive power, an object side is concave and an image side is concave. The sixth lens 360 has positive refractive power, an object side is convex and an image side is convex. The seventh lens 370 has positive refractive power, an object side is concave and an image side is convex.

The image capturing lens system 300 includes a plurality of aspherical lenses. The second lens 320, the sixth lens 360, and the seventh lens 370 are formed as aspheric surfaces on both surfaces. The image capturing lens system 300 includes a lens made of a glass material to exhibit a certain degree of optical performance, even when temperature changes according to the external environment. The second lens 320, the sixth lens 360, and the seventh lens 370 are made of a glass material.

The image capturing lens system 300 includes a stop ST. The stop ST is disposed between the third lens 330 and the fourth lens 340.

The image capturing lens system 300 includes a plurality of filters 380 and 390. The filters 380 and 390 are disposed between the seventh lens 370 and an imaging plane IMG. At least one of the filters 380 and 390 may block infrared rays and another may be block contamination of the imaging plane by foreign substances.

The image capturing lens system 300 includes one or more cemented lenses. The image side of the fourth lens 340 and the object side of the fifth lens 350 are bonded.

The image capturing lens system 300 may have a wide angle of view. For example, the image capturing lens system may have an angle of view of 84.33 degrees. The image capturing lens system 300 may have a low F No. For example, the F No. of the image capturing lens system 300 is 2.06. The total focal length of the image capturing lens system 300 is 4.56 mm.

Table 5 illustrates the lens characteristics of the image capturing lens system 300, and Table 6 illustrates aspherical surface coefficients of the lenses.

TABLE 5

| Surface No. | Remark | Radius of Curvature | Thickness/ distance | Focal length | Index | Abbe No. |
|---|---|---|---|---|---|---|
| obj | Object | infinity | infinity | | | |
| 1 | 1st lens | 12.432037 | 0.85 | −17.635 | 1.5891 | 61.2 |
| 2 | | 5.5249886 | 1.2001465 | | | |
| 3* | 2nd lens | 13.5 | 1 | −10.195 | 1.4971 | 81.5 |
| 4* | | 3.6 | 5.7543969 | | | |
| 5 | 3rd lens | 21.44119 | 2 | 7.315 | 1.834 | 37.3 |
| 6 | | −8.221258 | 0.2 | | | |

TABLE 5-continued

| Surface No. | Remark | Radius of Curvature | Thickness/ distance | Focal length | Index | Abbe No. |
|---|---|---|---|---|---|---|
| 7 | Stop | infinity | 0 | | | |
| 8 | 4$^{th}$ lens | 10.407254 | 3.2945741 | 4.571 | 1.7725 | 49.6 |
| 9 | 5$^{th}$ lens | −4.631505 | 0.55 | −8.18 | 1.8466 | 23.7 |
| 10 | | 8.1290562 | 2.0749807 | | | |
| 11* | 6$^{th}$ lens | 6.8287514 | 2.1884515 | 11.503 | 1.592 | 67 |
| 12* | | −2277878 | 1.2967362 | | | |
| 13* | 7$^{th}$ lens | −800 | 2.4336256 | 28.41 | 1.8061 | 40.7 |
| 14* | | −22.39104 | 0.5 | | | |
| 15 | 1$^{st}$ filter | infinity | 0.4 | | 1.5167 | 64.1 |
| 16 | | infinity | 0.5 | | | |
| 17 | 2$^{nd}$ filter | infinity | 0.5 | | 1.5167 | 64.1 |
| 18 | | infinity | 0.2500904 | | | |
| IMG | Imaging plane | infinity | 0.0070884 | | | |

TABLE 6

| Surface No. | K | A | B | C | D |
|---|---|---|---|---|---|
| 3 | 9.138681561 | 0.006234662 | −0.00063552 | 2.38282E−05 | −5.5111E−07 |
| 4 | −4.97355441 | 0.02166521 | −0.00155893 | 7.29535E−05 | −1.9924E−06 |
| 11 | −9.99654036 | 0.003803373 | −0.00021784 | 1.1853E−05 | −3.0172E−07 |
| 13 | 0 | −0.00294936 | −0.00024366 | 3.41885E−06 | 4.55279E−07 |
| 14 | 9.839098299 | 0.001413918 | −0.0003769 | 1.61129E−05 | −2.243E−07 |

Figure 8:
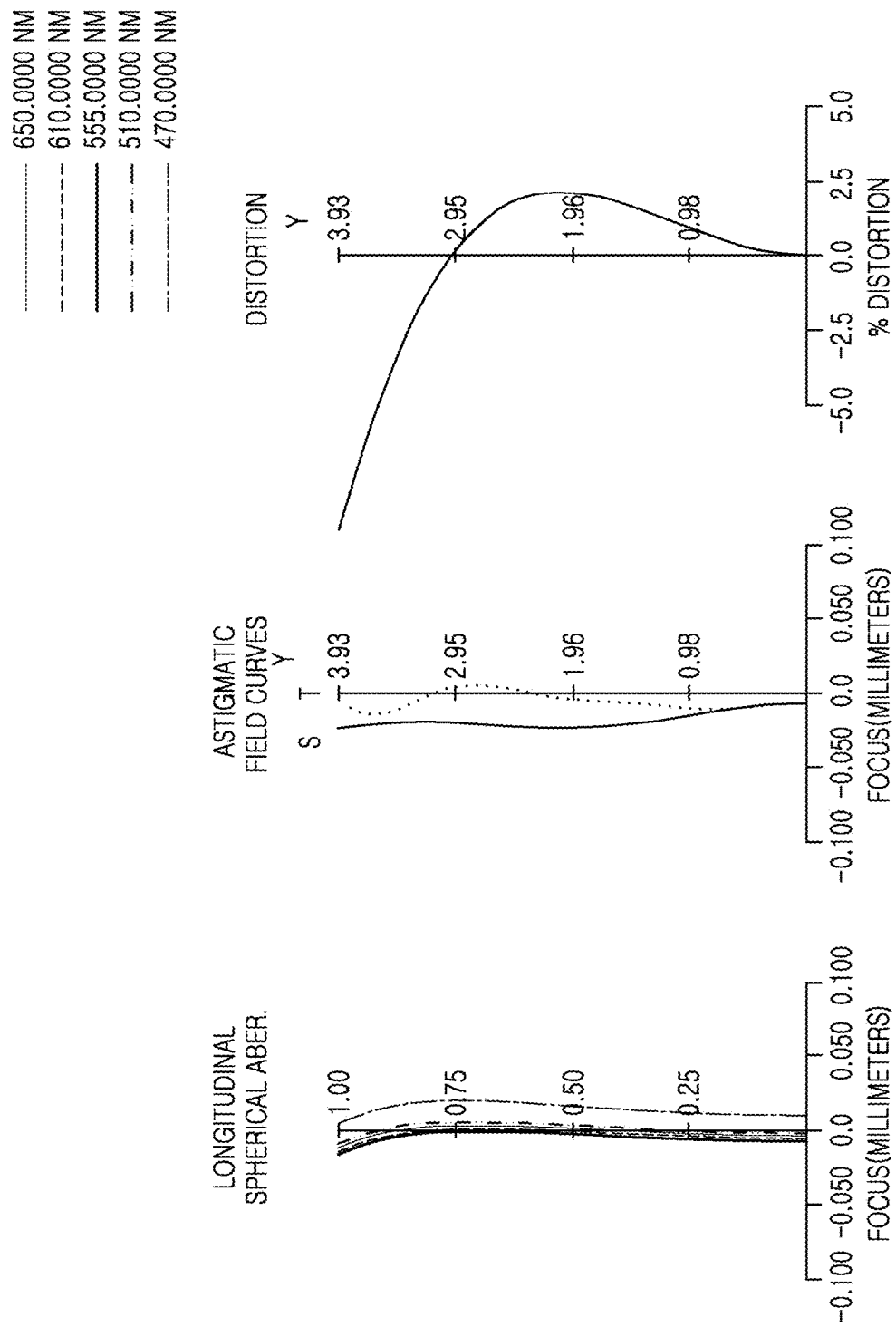
FIG. 8 is a diagram illustrating aberration curves of the image capturing lens system illustrated in FIG. 7.
Figure 9:
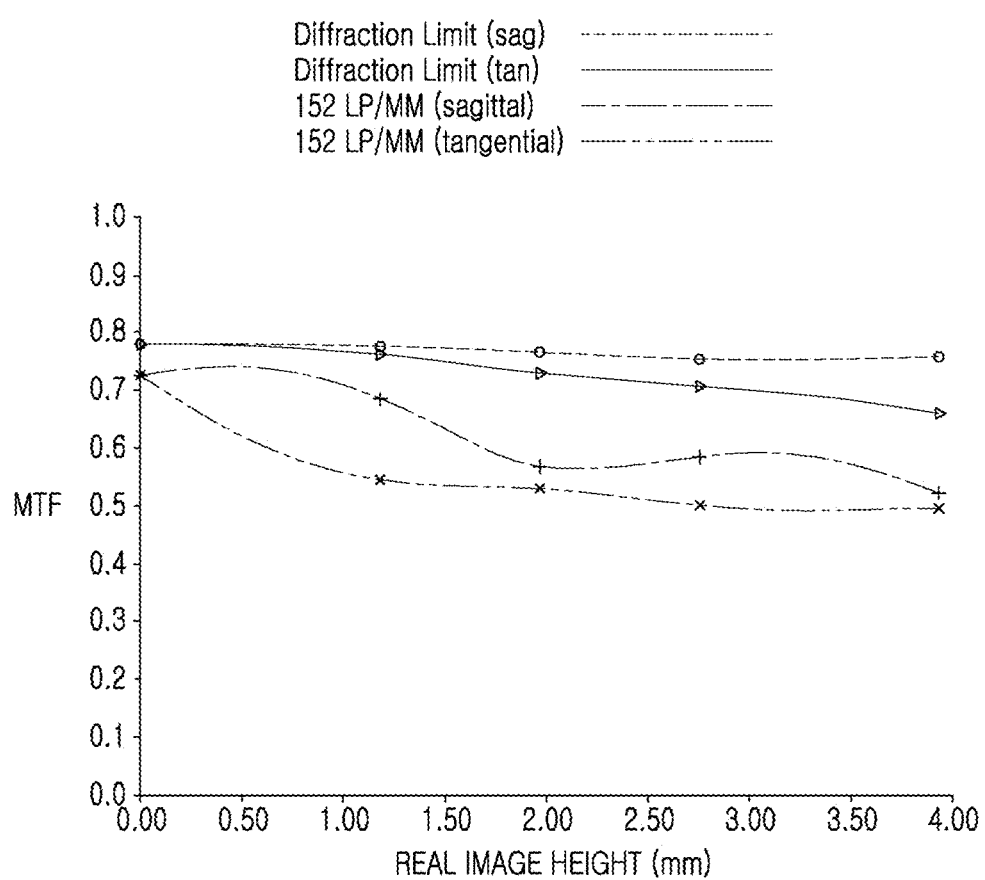
FIG. 9 is a diagram illustrating MTF curves according to a temperature change of the image capturing lens system illustrated in FIG. 7.

FIG. 8 illustrates aberration curves of the image capturing lens system 300, and FIG. 9 is a graph illustrating MTF characteristics of the image capturing lens system 300.

The image capturing lens system according to the various examples may realize the image having high pixels and resolution.

An image capturing lens system according to the examples is capable of capturing an image having high pixels and high resolution even in a high temperature change environment.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image capturing lens system comprising:
a first lens having a refractive power;
a second lens having a refractive power;
a third lens having a refractive power;
a fourth lens having positive refractive power;
a fifth lens having negative refractive power and a concave object-side surface;
a sixth lens having positive refractive power and a convex object-side surface; and
a seventh lens having a refractive power,
wherein the first to seventh lenses are sequentially arranged from an object side toward an image plane,
wherein the imaging capturing lens system comprises a total number of seven lenses with refractive power,
wherein a radius of curvature of an image-side surface of the first lens is greater than a radius of curvature of an object-side surface of the seventh lens,
wherein a radius of curvature of an object-side surface of the second lens is greater than a radius of curvature of an object-side surface of the sixth lens, and
wherein TTL/2Y<3.9, where TTL is a distance from an object side of the first lens to the imaging plane, and 2Y is a diagonal length of the imaging plane.

2. The image capturing lens system of claim 1, wherein the first lens has a convex object-side surface.

3. The image capturing lens system of claim 1, wherein the first lens has a concave image-side surface.

4. The image capturing lens system of claim 1, wherein the second lens has a convex object-side surface.

5. The image capturing lens system of claim 1, wherein the second lens has a concave image-side surface.

6. The image capturing lens system of claim 1, wherein the third lens has a convex object-side surface.

7. The image capturing lens system of claim 1, wherein the third lens has a convex image-side surface.

8. An image capturing lens system comprising:
a first lens having a refractive power;
a second lens having a refractive power;
a third lens having a refractive power;
a fourth lens having positive refractive power and a convex object-side surface;
a fifth lens having negative refractive power;
a sixth lens having positive refractive power and a convex object-side surface; and a seventh lens having a refractive power,
wherein the first to seventh lenses are sequentially arranged from an object side toward an image plane,
wherein the imaging capturing lens system comprises a total number of seven lenses with refractive power,
wherein a radius of curvature of an image-side surface of the first lens is greater than a radius of curvature of an object-side surface of the seventh lens,
wherein a radius of curvature of an object-side surface of the second lens is greater than a radius of curvature of an object-side surface of the sixth lens, and
wherein TTL/2Y<3.9, where TTL is a distance from an object side of the first lens to the imaging plane, and 2Y is a diagonal length of the imaging plane.

9. The image capturing lens system of claim 1, wherein the first lens has a convex object-side surface.

10. The image capturing lens system of claim 1, wherein the second lens has a convex object-side surface.

11. The image capturing lens system of claim 1, wherein the third lens has a convex object-side surface.

12. The image capturing lens system of claim 1, wherein the seventh lens has a concave object-side surface.

* * * * *